UNITED STATES PATENT OFFICE.

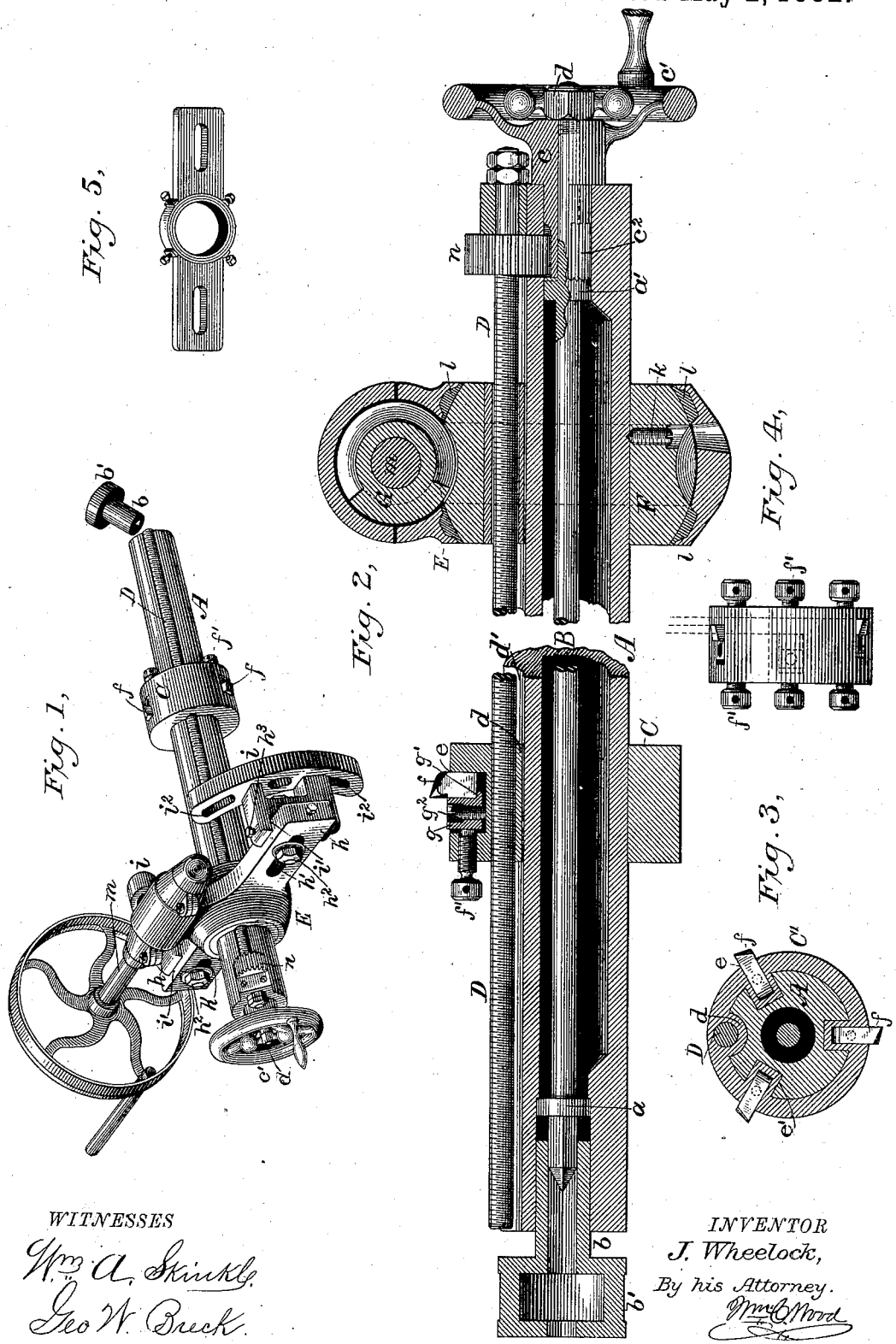

JEROME WHEELOCK, OF WORCESTER, MASSACHUSETTS.

METAL-BORING MACHINE.

SPECIFICATION forming part of Letters Patent No. 257,422, dated May 2, 1882.

Application filed July 19, 1881. (No model.)

*To all whom it may concern:*

Be it known that I, JEROME WHEELOCK, of the city and county of Worcester, in the State of Massachusetts, have invented certain new and useful Improvements in Metal-Boring Apparatus; and I do hereby declare that the following specification, taken in connection with the drawings furnished and forming a part of the same, is a clear, true, and complete description of the several features of my invention.

My said improvements relate specially to apparatus commonly known as "boring-bars" for the boring out of mounted steam-engine cylinders. Apparatus of this class is shown and described by me in my Letters Patent October 11, 1870, No. 108,310, and November 11, 1873, No. 144,583.

My present improvements have for their object simplicity in construction and a greater convenience and effectiveness in operation.

After a full description of an apparatus embodying my several improvements, the features deemed novel will be specified in detail in the several claims hereunto annexed.

Referring to the drawings, Figure 1 is a perspective view of a boring-bar embodying my present improvements. Fig. 2 is a central longitudinal section of the same. Fig. 3 is a lateral section of a preferred form of cutter-head mounted on its bar. Fig. 4 is a top view of the cutter-head shown in Fig. 3. Fig. 5 is a side view of a detached cross-head used with my apparatus.

The bar proper (denoted at A) is tubular in form and constructed in one continuous length; but it may be constructed in two or more parts, if desired, and jointed end to end by means of dowel-pins and holes or other suitable devices which will secure them together in proper relations to each other. Within the bar is an axial stem or spindle, B, extending from near the rear end of the bar to a point beyond the front end thereof, and near the ends of said spindle there are collars $a$ $a'$, around which the bar A is rotatively mounted. The extreme end of the spindle B beyond the collar $a$ is square and fitted to snugly occupy a correspondingly-chambered sleeve, $b$, the outer portion of which is cylindrical and occupies the interior of that end of the bar A. The sleeve $b$ has an enlarged head, $b'$, which, when in use, is non-rotatively mounted in a detachable cross-head secured to an engine-cylinder by some of the bolts usually employed for securing a cylinder-head in position. Such a cross-head is shown in Fig. 5. The outer end of the spindle B is round, and at times in part serves as a journal for the sleeve $c$, which has a hand-wheel, $c'$, at its outer end and is toothed or geared, as at $c^2$, at its inner end. The extreme outer end of said spindle is threaded to receive a jam or locking nut, $d$, which, by bearing against the outer face of the hand-wheel $c'$ and forcing the inner end of sleeve $c$ against the collar $a'$ on the spindle, serves to lock the sleeve and spindle together, so that said sleeve may at times be made either non-rotative or capable of independent rotation, according to whether said locking-nut be tightened or loosened. The bar being tubular instead of solid, as heretofore, enables me to make bars suitable for the heaviest work of such lightness as permits them to be conveniently and easily handled during their adjustment for service.

The cutter-head C may be constructed in various ways, those shown in my prior Letters Patent being capable of use with this bar, provided they be so far modified in construction as to fit the same; but I have specially devised the cutter-heads now shown with reference to their use with my improved bar. My former cutter-heads were rendered non-rotative on the bar by means of a separable lug or spline on the head, which was traversed by the feed-screw and occupied the feed-screw groove. The cutter-head C, Fig. 2, has an integral lug or spline, $d$, which occupies the groove $d'$ in the bar, and the feed-screw D passes through said lug, which is correspondingly threaded. This head differs from my prior cutter-heads in that it has no radial arms on which tool-holders are mounted, and has no gibs and set-screws for securing an adjustment of slide bearing between the head and bar, although such gibs may be used, if desired. This cutter-head contains radial recesses $e$, opening at the periphery for the endwise reception of the cutters, as hereinafter explained, and although such a head is preferable in many ways than one having radial arms, as heretofore, its prime value is due to the fact that with the recessed cylindrical head I can, for instance, bore out a cylinder of, say, seven and three-fourths inches inside diameter with a boring-bar of seven inches diameter, that being of sufficient size for use in boring out cylinders of maximum diameter. This is rendered possible because the recesses e in the head for the reception of the cutters may be extended internally beyond the periphery of the bar, as illustrated in Fig. 3, wherein the cutter-head C' is provided with the threaded lug or spline d, which is traversed by the feed-screw D and occupies the screw-groove in the bar A, as before described; but in this case the bar is also provided with additional longitudinal grooves e', which not only serve to receive the inwardly-extended recessed portions of the cutter-head, but also serve as additional security against the rotation of the head independently of the bar, and still further serve to more accurately guide the cutter-head on the bar than would be the case with the single lug in the feed-screw groove.

As illustrated in the drawings, I employ three cutters, progressively advanced in the line of the bar, as indicated by the dotted lines in Fig. 4; but more or less cutters may be employed, as may be deemed proper.

In one of my prior patents before herein referred to, No. 144,583, I show means for radially extending the cutters f, and such means, broadly considered, are common in metal-working tools. The particular combination, with a recessed cylindrical cutter-head and boring-bar, of the means now devised for use therewith is believed to be novel. The recess e is snugly occupied by the cutter at two sides thereof, as seen in Figs. 3 and 4, and also at one other side, as seen in Fig. 2. One or two clamping-screws, f', may be employed, as shown, two being preferable, because one is then always accessible from one end of a cylinder when the boring-bar is in working position. For advancing the cutter radially I have devised the lifting-blocks g, which are fitted to readily enter the recess e, and afford opposite faces for contact respectively with one side of the cutter and the inner end of a clamping-screw, f'. At the inner face of the lifting-block and at its lower end there is a projecting bearing-shoulder, g', upon which the cutter rests endwise, and a screw, $g^2$, through the center of the lifting-block bears at its inner end upon the bottom of the recess e, so that when the cutter is loosened it may be advanced radially by turning the screw $g^2$ so as to lift the block g; or the cutter may be set farther inward after an opposite rotation of said screw.

Heretofore the rotation of the bar and cutter-head has been effected by means of a chain of gearing contained within a pair of face-plates, which also served as a crank-arm in feeding the cutter-head along the bar, and had at its outer end a crank for driving the gearing, and thereby rotating the boring-bar and cutter-head. I have now much simplified this portion of the apparatus, and rendered it much more convenient in use, because the crank-shaft now occupies but one position instead of having a planetary motion, as heretofore, and this enables me to apply a driving-belt with power when desired, instead of relying wholly upon a hand-crank. With my former apparatus a front cross-head was employed, wholly independent of the face-plates which contained the gearing; but I have now combined the gearing with a cross-head, and so constructed the latter as to render it readily adjustable to the ends of cylinders of various sizes.

The main cross-head E has two projecting arms, h, which are slotted at h' in a line radial to the axis of the bar. Two novel brackets, i, are employed in connection with the cross-head, each of which has a seat at i' for one end of the cross-head, a clamping-screw, $h^2$, which occupies one of the slots h' in the cross-head, and set-screws $h^3$, which bear against the upper and lower edges of each arm of said cross-head, thus providing for the speedy adjustment of the boring-bar centrally within cylinders of various sizes. The bases of the brackets i are provided with several bolt-slots, $i^2$, one or more of which may surely be relied upon for the reception of one or more of the usual bolts common to all cylinders.

Within the central portion of the cross-head is a semi-spheroidal chamber, which serves as a journal-box for the reception of a semi-spherical worm-gear, F, which serves the double purpose of a journal for the bar with relation to the cross-head, and also as a gear by which said bar is rotated, the gear being mounted on said bar and secured in position by a set-screw, k, clearly shown. The bar can, however, be moved longitudinally with reference to said gear when the set-screw k is loosened. The cross-head recess is preferably chambered for the reception of rings of Babbitt metal cast therein, as at l, and the periphery of the worm-gear F, adjacent to each side thereof, is not toothed, but presents smooth bearing-surfaces corresponding to the adjacent surfaces of the chamber. The teeth of gear F are centrally located, and are of such curve and pitch as to be properly engaged by the worm G, which is housed in the upper portion of the cross-head at right angles to the boring-bar, and the worm-shaft m constitutes the driving-shaft, and is provided with a crank and pulley.

The feed-screw D is shown to be provided with a sleeve, (within gear F and partially within the feed-screw slot in the bar,) which serves as a journal-box for preventing the springing of the feed-screw. I deem this feature of housing the gearing of a boring-bar within a cross-head of great practical value, regardless of the particular type of gearing employed. Although I prefer the worm and its gear in this connection, I do not wholly limit myself thereto, for it is obvious that plain or bevel gearing may be employed and housed in substantially the same manner; but in such case the gear on the bar should be of large diameter, and the driving-shaft and its pinion would be parallel with the axis of the bar, instead of at right angles thereto, as deemed preferable by me. The semi-spherical bearing by which the cutter-bar is mounted in the front cross-head contributes greatly to the ease with which the bar can be operated and adjusted, and it enables the bar to successfully resist the ordinary thrust and pull thereon incident respectively to working from or toward the front cross-head in boring out a cylinder.

The feed-screw D, near its outer end, has a gear, $n$, with which the gear $c^2$ meshes at the inner end of the hand-wheel sleeve $c$. If it be desired that the feed-screw be capable of rotation only by rotating the bar, the geared sleeve $c$ may be non-rotatively and permanently mounted upon the spindle B and the jam-nut dispensed with, and also the hand-wheel. In my prior Letters Patent, No. 108,310, I describe and claim means for operatively connecting and disconnecting a geared stem to and from the feed-screw gear; but as therein organized they were in direct communication with face-plates which contained the gearing.

If it be desired to rely on hand-feed alone, the jam-nut may be dispensed with, and a washer and pin substituted for keeping the wheel-sleeve on the spindle.

With the detailed description thus given it will be readily seen that the cross-head, Fig. 5, can be secured at one end of the cylinder, and the chambered sleeve $b$ mounted therein with its head $b'$ centrally located and secured within the eye of said cross-head, that the inner end of the bar on being placed within the cylinder can be axially mounted on said sleeve, with the square end of the spindle B housed therein, and the cross-head (by loosening screw $k$) be moved longitudinally on the bar until in proper contact with the opposite end of the cylinder and then be secured thereto; or the brackets of the outer cross-head may be first separately placed in their proper position, and the bar and front cross-head lifted into the seats on the brackets, and the rear cross-head then located and the sleeve $b$ placed in proper position relatively to the inner end of the bar and its spindle, according as may be desired in each case. The bar being properly mounted, the cutter-head is rotated by the rotation of the worm-shaft. The movement of the cutter-head longitudinally on the bar can be effected automatically through the rotation of the bar, or by hand, whether the bar be rotating or stationary. The spindle B being non-rotative, the hand-wheel $c'$ may be also rendered non-rotative by means of the jam-nut $d$, and therefore as the bar revolves with the feed-screw the latter will be independently revolved on its own axis by the meshing of the gear $n$ thereon with the stationary gear $c^2$ on the sleeve $c$ when thus locked to the spindle. The coincident surfaces of the geared sleeve and collar $a'$ on the spindle B may be slightly serrated, as shown, for more readily locking the sleeve to the spindle. On the release of the jam-nut $d$ the sleeve-gear will have no driving-power and will revolve with the bar; but in that condition, whether the bar be rotating or not, the cutter-head may be moved to and fro on the bar by turning the hand-wheel $c'$. After making a cut within a cylinder the cutter-head is then located near either end thereof, and readily accessible for a readjustment of the cutters.

If at any time while the cutter-head is near the middle of a cylinder it is deemed desirable to withdraw or advance the head without cutting or scoring the surface thereof, the clamping-screws may be loosened, the cutters forced inward, and reclamped.

If power is available, as from a donkey-engine, a belt may be readily applied to the pulley on the worm-shaft.

While I prefer to embody in one apparatus all of the several features of my invention, substantially as illustrated in the drawings, I am aware that most, if not all, of said features may be separately employed with good results in connection with other mechanism than that shown by me.

Having thus described my invention, I claim as new and desire to secure by Letters Patent—

1. The combination, with a boring-bar and its front cross-head, of gearing for rotating said bar, which is housed within said cross-head, substantially as described.

2. The combination, with the boring-bar and the cross-head, of the worm and its shaft, and the gear serving at its periphery as a journal for the bar and meshing with the worm, substantially as described.

3. The combination of a boring-bar, provided with a semi-spherical journal, and a cross-head provided with a bearing to receive said journal, substantially as described.

4. The combination, with the tubular bar and rotating mechanism, the feed-screw, its gear, and a cutter-head, of the non-rotative central spindle and the geared sleeve thereon, which meshes with the gear on the feed-screw, substantially as described.

5. The combination, with the tubular bar and rotating mechanism, the feed-screw, its gear, and a cutter-head, of the non-rotative central spindle, the geared sleeve meshing with the gear on the feed-screw and mounted on said spindle, and a hand-wheel for rotating said sleeve, substantially as described.

6. The combination, with the tubular bar and rotating mechanism, the feed-screw, its gear, and a cutter-head, of the non-rotative central spindle, the geared sleeve meshing with the gear on the feed-screw, a hand-wheel for rotating said sleeve, and a locking-nut for rendering said sleeve non-rotative during the rotation of the bar, substantially as described.

7. The combination, with the cutter-head provided with one or more recesses for the reception of cutters, of lifting-blocks and their lifting-screws within said recesses for radially projecting the cutters, and a clamping screw or screws for confining each block and cutter within a recess, substantially as described.

8. The combination, with a boring-bar provided with longitudinal grooves, of a cylindrical cutter-head provided with inwardly-projecting portions, which occupy the grooves in the bar and are recessed radially from the periphery for the reception of cutters, substantially as described.

9. The combination, with a boring-bar cross-head, of detachable brackets provided with seats for the ends of the cross-head, and means for securing the cross-head thereto and variably adjusting it thereon, substantially as described.

JEROME WHEELOCK.

Witnesses:
A. H. RAYNAL,
E. KIMMEL.